United States Patent [19]

Vetter

[11] Patent Number: 4,612,961
[45] Date of Patent: Sep. 23, 1986

[54] TUBE SEALING DEVICE

[76] Inventor: Manfred Vetter, Burg Langendorf, 5352 Zülpich, Fed. Rep. of Germany

[21] Appl. No.: 730,786

[22] Filed: May 6, 1985

[30] Foreign Application Priority Data

May 5, 1984 [DE] Fed. Rep. of Germany ....... 8413877

[51] Int. Cl.[4] ........................................... F16L 55/12
[52] U.S. Cl. ...................................... 138/93; 138/89; 138/90
[58] Field of Search ............................. 138/93, 89, 90; 15/104.06 R; 220/239

[56] References Cited

U.S. PATENT DOCUMENTS

| 2,399,544 | 4/1946 | Danner | 138/93 |
| 2,870,794 | 1/1959 | Thaxton | 138/90 |
| 3,173,449 | 3/1965 | Custer et al. | 138/93 |
| 3,200,984 | 8/1965 | Fueslein et al. | 138/89 |
| 3,353,565 | 11/1967 | Markham | 138/89 |
| 3,431,946 | 3/1969 | Sawyer | 138/93 |
| 3,749,131 | 7/1973 | Burger | 138/89 |
| 3,895,652 | 7/1975 | Zach | 138/89 |
| 3,903,730 | 9/1975 | Matthews, Jr. et al. | 138/90 |
| 4,377,184 | 3/1983 | Vetter | 138/93 |
| 4,422,477 | 12/1983 | Wittman et al. | 138/89 |
| 4,493,344 | 1/1985 | Mathison et al. | 138/89 |

FOREIGN PATENT DOCUMENTS

| 2748614 | 5/1979 | Fed. Rep. of Germany | 138/93 |
| 79563 | 11/1955 | Netherlands | 138/93 |

Primary Examiner—Stephen Marcus
Assistant Examiner—Leo James Peters
Attorney, Agent, or Firm—K. S. Cornaby

[57] ABSTRACT

The sealing device for a tube of the invention is constructed bowl-shaped and consists of a jacket, which can be pressed areally against the inner wall of a tube to be sealed. The jacket on the forward side extends into a sealing lip. There is an end partition. The sealing lip has a free end, and by means of a spreading device can be pressed, including the free end, against the inner wall of a tube. In a preferred embodiment, the device has a hydraulically or pneumatically fillable inner space.

10 Claims, 6 Drawing Figures

TUBE SEALING DEVICE

BACKGROUND OF THE INVENTION

This invention relates to a tube sealing device with a cylindrical jacket which can be pressed areally against the inner wall of the tube. The jacket is made of a flexible material impermeable to liquids and gasses, and it has an end partition facing the pressure source and an end partition facing away from the pressure source. The tube is provided with a circular partition made of material impermeable to liquids and gasses which seals the jacket tightly at the end away from the pressure source.

A sealing device as described in U.S. Pat. No. 3,459,230 for a tube of the type mentioned is constructed as a sealing pad which, in addition to the named end partition, has an additional end partition which together provide a cylindrical inner space. If the inner space is filled with a gas or a liquid under pressure, the cylindrical jacket, especially in its middle area, bulges out radially and the jacket takes on a somewhat barrel shape. The diameter of the frontal end partitions remains constant during the filling. Near the two frontal end partitions, the outer diameter must be a little smaller than the inner diameter of the tube so that the device, which in its unpressurized state is essentially cylindrical, can be inserted into the tube.

This of necessity has the result that the sealing pad lies against only a part of the total length of the jacket along the inner wall of the tube. Near the end partitions there always remains a gap between the jacket and the inner wall of the tube. This gap tapers, starting at the end partitions, like a wedge towards the other end partition. The effective length of the gap, where the sealing pad actually touches with its jacket on the inner wall of the tube is, therefore, given by the geometric axial length of the jacket less the length of the two wedge-shaped gaps near the end partitions.

A sealing pad filled, for example, with air at 1.5 bar does not abut between these two wedge-shaped gaps with its full pressure against all places along the inner wall of the tube. At one place, where the gap decreases to nothing and the jacket touches the inner wall of the tube, the pressure is practically zero. The pressure increases from this point continuously up to the middle of the pad, and has, at least in the middle of the pad, but in general over a certain part of the axial length of the pad, the value of the inflation pressure. The pad in the example, inflated at 1.5 bar, thus abuts along only a part of its effective length, which is also shorter than its geometric length, with a pressure of a 1.5 bar against the inner wall of the tube.

The normal force with which a filled sealing pad abuts against the inner wall of a tube is determined essentially by the product of its inflation pressure and a fraction of the surface of its outer jacket. The disadvantage thereby is that the total surface of the outer jacket is not effective, and also that the normal force is not dependent on the acting counter force, that is, the pressure of a fluid or gas to be sealed out. In practical use, on the one side of the sealing pad there is found fluid under pressure, or gas under pressure. If the pressure of the medium to be sealed out is greater than the atmospheric pressure, then on the load side of the pad the gap next to the outer wall becomes longer. Expressed in a different way, the place where the outer jacket abuts with no pressure against the inner wall of the tube moves towards the center of the pad. This lengthening of the gap along the sides and the splitting effect impair the function of the sealing pad in a disasterous way: The higher the counter pressure to be sealed out, the longer the gap along the sides, and therefore, the shorter becomes the actual effective length of the device. In this way, with increasing counter pressure the normal force with which the sealing pad presses against the inner wall of the tube is decreased.

It would be desirable if the opposite were true, that is, that the normal force would increase with increased counter pressure. This is, however, not the case with the known sealing pads. As stated above, the inner pressure determining the normal force in the sealing pad is a value assumed to be existing, and is independent of the counter pressure and that part of the outer jacket which abuts against the inner wall of the tube. Thus the abuting force becomes smaller as the counter pressure increases.

The result is that a pad of the construction described above cannot withstand counter pressures which are equal to, or larger than, its inflation pressure. When the counter pressure is equal to the inflation pressure in the sealing pad, the sealing pad has the same shape as it does in the uninflated state, i.e., cylinder shape. In this case, the gap described above on the pressure side is found along the entire length of the obturator pad, and it joins together with the gap on the other, non-pressure side.

Since the sealing pad always loses its sealing power whenever the counter pressure is equal to the inner pressure, the result is that the sealing pad, even at pressures lower than the internal pressure, begins to slip within the tube.

With the above observation in mind, the static friction between the outer jacket and the inner wall of the tube could be disregarded. A rough calculation of the static friction shows, however, that the sealing pad can remain in a fixed position even when the counter pressure is several times its internal pressure if (1) the counter pressure is prevented from acting on the jacket surface of the sealing pad, and (2) the gap which necessarily exists is prevented from increasing. That is to say, this is true if it is possible to prevent the counter pressure from decreasing the force with which the pad abuts against the inner wall of the tube to be sealed.

BRIEF SUMMARY OF THE INVENTION

The purposes of the invention are to avoid the disadvantages of the known sealing device for tubes and to create a new and novel device which can withstand much higher counter pressures than the known sealing device without slipping through the medium to be blocked; whereby, in particular, the counter pressure of the medium is to be used to increase the abutting force of the sealing device.

Beginning with the device of the known type, this task is solved by adding a circular lip to the end partition on the pressure side, made of a flexible material impermeable to gas and fluids. This lip has a free end which is constructed so that a spreading device, which can be reset, can press the lip and its free end onto a closed ring surface and onto the inner wall of the tube.

The basic idea is as follows: The actual sealing area of the sealing device is placed on the end of the sealing device facing the pressure. At the same time, this end area is shaped like a bowl. Because of the bowl shape, the pressure of the medium to be blocked is directed onto the inner wall of the lip and thus onto the inner wall of the jacket and causes there an outward pressure which becomes larger as the pressure of the medium increases.

Before the medium to be blocked is in the tube, or before the medium to be blocked is able to build up a counter pressure on the sealing device, the lip is pressed against the inner wall of the tube by a spreading device with a considerable force. This force is not released from the medium to be blocked after the application of the counter pressure, but is increased even more. In the area of the sealing lip, therefore, a tight seal is first brought about, and then the lip is pressed ever harder against the inner wall as the counter pressure increases, and the normal force receives an added quantity. It is very advantageous thereby that this quantity grows as the counter pressure increases.

In the preferred construction of the invention, between the lip and the end partition away from pressure, there is located a circular partition impermeable to fluids and gas. This partition, together with the jacket and the end partition, forms a sealed, inflatable inner space, which is accessible preferably through the end partition.

With this addition to the inflatable sealing pad mentioned above, the actual sealing area of the pad is changed to a place in front of the partition facing the pressure. In this way wedge-shaped, circular gaps around the jacket are prevented. No longer does the inflation pressure determine at what counter pressure the pad in the tube begins to slip. In particular, the abutting force of the jacket is now independent of the pressure of the blocked medium. This is because the lip prevents the wedge-shaped gaps from forming near the end partition on the pressure side, and thus the abutting surface of the jacket does not decrease.

The inner space which can be filled with liquids or inflated with gas in this new invention does not serve to create a seal, but it does increase the abutting force of the sealing device against the inner wall of the tube. In addition, this makes possible a fixing of the sealing device at any desired location along the length of the tube, whereby it becomes possible to adjust the lip after the sealing device has been put in place. Finally, the form change caused by filling the inner space can be used advantageously to press the lip mechanically against the inner wall of the tube.

In a preferred form of the invention, the lip is expanded and forced against the inner wall of the tube. This radial force, which is directed against the lip, is provided by a compressed spring, or by the spreading device. In this way it is made certain that the lip cannot be removed or forced away from the wall by the counter pressure of the blocked medium. If the lip at only one small spot on the pressure side did not press firmly against the inner wall of the tube, then the medium under pressure would flow between the lip and the inner wall and the pad would become ineffective, because then the gap effect described above would occur.

It is advantageous that the lip in a relaxed, inactive state of the spreading device, especially when the inner space is not filled, is small in circumference and fits into a cylinder whose radius is not larger than the end partition. In this way it is possible to insert the sealing device into a tube without causing additional obstruction or damage to the lip. When the spreading device is activated, especially after the inner space has been filled, the lip presses radially against the inner wall of the sealed tube with the abutting force described above.

The larger the inner surface of the lip and the larger the surface of the expanded jacket, the greater is the abutting force of the sealing device on the inner wall of the tube. The lip, therefore, should have the greatest possible axial length. In particular, it is suggested that the axial length of the jacket including the lip be more than twice as long as the diameter of the jacket, viz. the lip.

THE DRAWING

Preferred embodiments of this invention are described herein with reference to the following drawings, in which:

FIG. 1 is an axial section through a portion of a tube showing a sealing pad with a lip extending to the left towards the direction of pressure;

FIG. 2, a section similar to FIG. 1, showing a partition near the lip which is deformed when the inner space is filled and which is provided with a wire snap;

FIG. 3, a perspective view of a foldable sealing pad in its folded state;

FIG. 4, an axial section of the front-end area of a sealing pad facing towards the pressure side, with a device for increasing the spreading force of the lip;

FIG. 5, an axial section of a bowl-shaped sealing device with a ring chamber as spreader; and FIG. 6, an axial section of bowl-shaped sealing device with a spiral spring as spreader.

DETAILED DESCRIPTION OF THE ILLUSTRATED EMBODIMENTS

Figure 1:
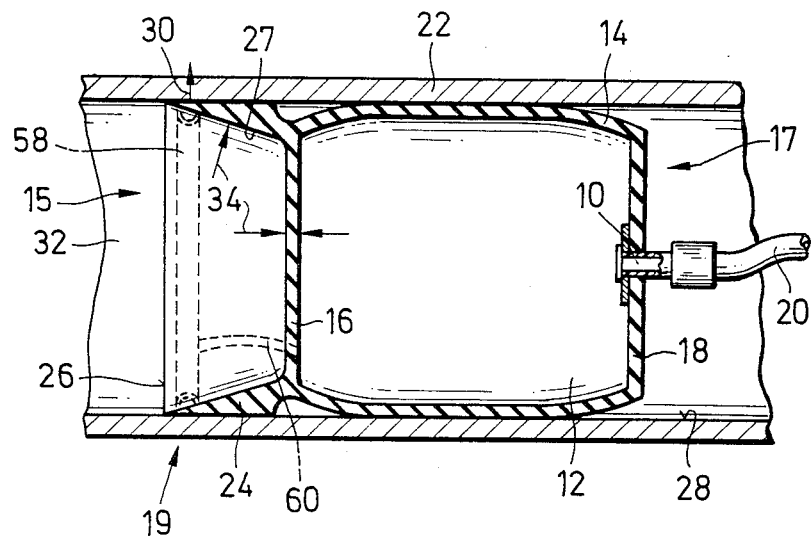

In FIG. 1 a sealing device is illustrated which has an inner space 12 which is accessible through a nipple 10. The inner space is bounded by a cylindrical jacket 14, a left partition 16 on the pressure side, and a right partition 18 on the side opposite from the pressure side. Nipple 10 is located in the end partition 18 away from pressure. Attached to nipple 10 is an inflation hose 20. The sealing pad described up to this point agrees with the state of the art, e.g., it bulges out in the shape of a barrel, as FIG. 1 shows when filled, for example, with an air pressure of 1.5 bar. The outer diameter near partitions 16 and 18 is smaller than the inner diameter of the tube to be sealed 20, so that the sealing device in the non-inflated state (or when not filled with fluid) can be inserted easily into the tube 22.

On the left partition 16, the axial extension juts outward to form a circular, ring-shaped sealing lip 24. The lip has a front, free end 26 on the pressure side, which runs out to a point. Under pressure it lies against the inner wall 28 of the tube to be sealed 22. This is symbolized by arrow 30. This positioning of the free end 26 is maintained over the entire inner circumference of tube 22, so that opposite space 30 to the left where pressure is applied a tight seal is brought about in the area of the lip 24.

The medium to be blocked is in space 32, which stands under pressure, described as counter pressure to be blocked out. Because this counter pressure acts in all directions, it also acts on the inner side 27 of the lip 24 and presses the lip 24 against the inner wall 28 of the tube 22. Through this, the sealing function of the lip 24 is increased when pressure increases in space 32. At the same time the normal force increases with increased pressure with which the lip 24 abuts areally against the inner wall 28. The total normal force is to be multiplied by the static friction between the material of the sealing device and the inner wall 28. It must be greater than the force with which the blocked medium in space 32 presses on the surface of partition 16. Thereby, the counter pressure in space 32 can be much greater than that in the inner space 12.

The sealing lip 24 is provided with a spreading device 19. This has the following function. When the spreading device 19 is not activated, the lip is in a radially retracted position and it lies within a cylinder whose radius is smaller than the inner radius of tube 22. When the spreading device is activated, the lip 24, especially at its free end 26, is pressed outward and lies around the circle on all surfaces pressed against the inner wall 28 of the tube 22 to be sealed.

The example illustrated in FIG. 1 shows the spreading device 19. It has a sealed, circular ring chamber 58 located next to the inner side 27 of the lip 24. The ring chamber can be filled with a pressure medium, in particular, air or water. In the drawing, it is connected by means of a hose 60 to the inner space 12. The hose 60 does not need to be connected with the inner space but can be led in through the right end partition 18 so that the ring chamber 58 independently of the inner space 12 can be filled or emptied. The ring chamber 58 is located as near as possible to the free end 26 of the lip 24.

In the given illustration, in FIG. 1, the ring chamber is bounded by a part of the inner side 27 of the lip 24 and a semi-circular ring in profile. Other arrangements especially as a pressure tube, or other shapes are possible. What is definitive is merely that the ring chamber 58 when filled, expands radially and the lip 24, especially its free end 26, is pressed against the inner wall 28. This prevents the formation of a wedge-shaped space forming at the free end 26 under counter pressure 34.

Figure 2:
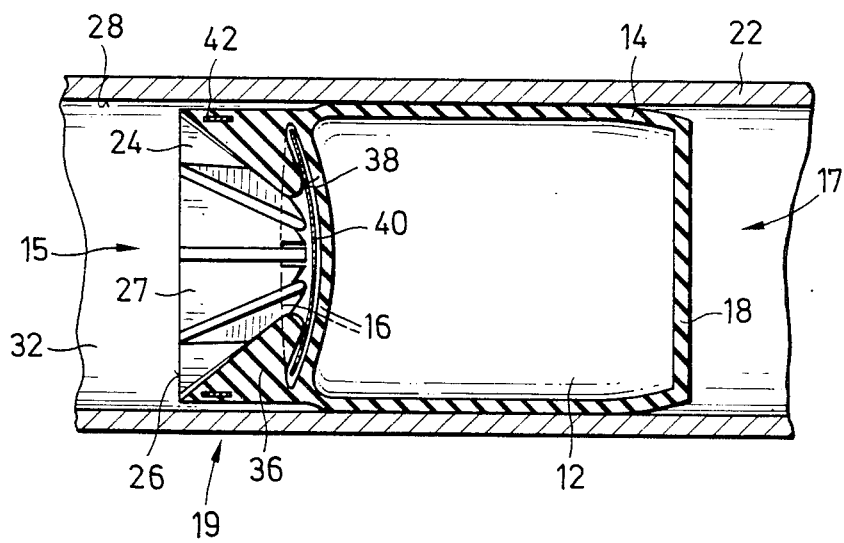
Figure 3:
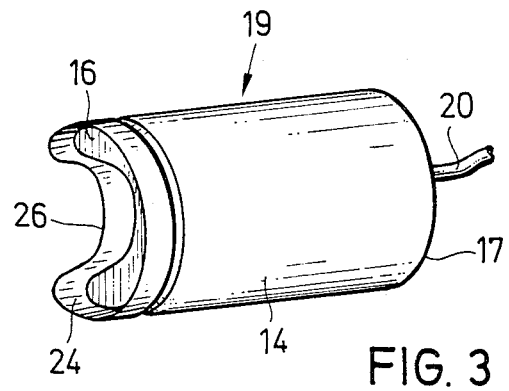
Figure 4:
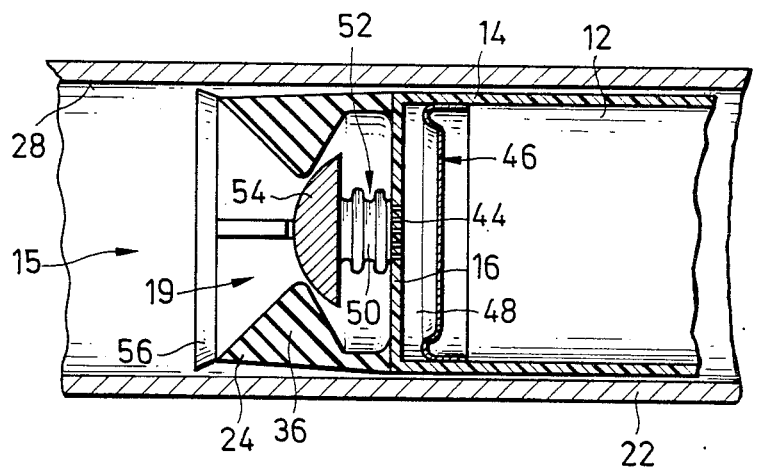

In FIGS. 2 through 4, three alternatives for the sealing device with inner space 12 are shown in which the lip 24 assumes a retracted position when inner space 12 is not filled. This facilitates the insertion of the sealing device into tube 22. Subsequently, after filling the inner space 12, the lip 24 is pressed forcefully against the inner wall 28.

In the illustration in FIG. 2, the retracted lip is represented and the inner space is not filled. Partition 16 on the pressure side is illustrated as being flexible. It changes shape when the inner space 12 is filled and bulges out axially in the direction of the lip 24. In the state represented in FIG. 2, the partition 16 bulges out to the right, that is inwardly and dish-shaped. In the filled state of inner space 12, the partition 16 is forced outwardly as represented by the dotted line. This movement is used to bring the lip 24 into the position illustrated in FIG. 1 against the inner wall 28.

On the inner side 27 of the lip 24, a total of eight evenly spaced, triangularly shaped transfer parts 36 move radially to the inside. They are joined to the lip 24 and press against the outer side of the partition 16 with their lower, rounded surfaces 38. If this partition 16 moves into the position indicated by the dotted line, that is, bulged to the left, then it presses on the surface 38 of the transfer parts 36. These parts 36 transmit the axial pressure to bring about a radial spreading of the lip 24. Thus the position shown in FIG. 1 is attained.

In FIG. 2 there is a star-shaped, flat spring 40 with eight points or arms. The spring is stamped out of sheet spring steel. It is designed as a wire snap, and therefore has two stable states. Its points or arms are each connected to the surface 38. The sealing lip is initially tensioned radially outward, by a spiral spring 52 or by another suitable means, for example, by its shape. The state of the lip 24 represented in FIG. 2 is maintained by the fact that when the sealing pad is not filled, a force is exerted from the left on the partition 16, or that in the inner space 12 a negative pressure is exerted. Through this, the star-shaped spring 40 and the partition 16 assume the illustrated inward bulged shape. At the same time, through the transfer parts 36 a force is exerted on the lip 24 against the action of the spiral spring 42. Through this the lip 24 is pulled a little inward and is located within an imaginary cylinder, the diameter of which does not exceed the inner diameter of the tube 22. The diameter is essentially determined by the diameter of partitions 16, 18. In the described position, lip 24 is no problem when inserted or extracted; its free pointed end cannot be damaged.

As soon as a pressure is exerted in the inner space 12, which moves the partition 16 outward onto the dotted position, then the star-shaped spring 40 is forced into its other snap position. The lip 24 in this way is pressed against the inner wall 28 forcefully, as in FIG. 1. If transfer parts 38 are not connected to partition 16, then the lip, through a negative pressure in the inner space 12, could not be pulled into the concave shape shown in FIG. 2. This has the following advantage. When partition 16, through a high counter pressure, is forced to the right out of the dotted position—for example, when pressure in the inner space 12 and the counter pressure in space 32 are equal and have a very even course—then the outward force of the lip 24 is not influenced since it comes from springs 40, 42. Since removal of the sealing device from tube 22 takes place in the direction opposed to the lip 24, making damage less probable, this alternative has many advantages.

In FIG. 3, a sealing device is shown in a folded state. It is held in this state because of a negative prssure in inner space 12 or because of an automatic tying system. The sealing device according to FIG. 3 is constructed fundamentally the same as the example in FIG. 1. The differences are specifically, partitions 16, 18 are flexible and foldable, so that the illustrated, somewhat moon-shaped state is attained. The sealing lip 24 has its own built-in or an external tension, as described above for spring 42 in the example in FIG. 2, and it exerts pressure when inner space 12 is inflated. The sealing device then assumes the shape illustrated in FIG. 1 with a radially acting force in the sense of arrow 30 of FIG. 1 against the inner wall of a tube 22 to be sealed. The removal of the sealing device as shown in FIG. 3 is facilitated when in its inner space 12 a negative pressure is produced. This sealing device, for example, can be built similar to the device disclosed in U.S. Pat. No. 4,377,184, however, with an additional elastic, ring-shaped sealing lip 24. In addition to the illustrated C-shaped folded state, other folded states can be used. Basically, it is also unnecessary that the jacket 14 abuts on the total inner circumference of the inner wall 28 of a tube 22, because it serves only for adhesion and not for sealing. Sealing is accomplished by the sealing lip 24. Preferably, the latter is made of a rubber-elastic, expandable material. It can be folded easily or bent without losing its ability to expand radially outward when in the inflated state of the sealing pad.

In the illustrated example in FIG. 4, partition 16 is essentially fixed, and in it there are a number of vents 44. On the right side of partition 16 there is circular membrane 46 in the inner space 12. It seals off hermetically a space 48 located to the right of the vents 44 from the inner space 12. It is constructed as a rolling membrane. To the left of the vents 44 there is also a sealed space 50 which is limited by a folding bellows 52 and a hemispherical shaped body 54. In the spaces 48, 50 is found a pressure medium, for example, a hydraulic fluid. Since the surface of membrane 46 is larger than the cross-sectional surface of the folded bellows 52, a considerable transfer of force is attained. In this way, on the one hand, a large enough abutting force for the sealing lip 24 is produced, and on the other, a higher counter pressure than the inflation pressure in the inner space 12 is prevented from pushing body 54 to the right.

In the illustrated uninflated state, the sealing lip 24 is retracted. Body 54 is in its end position to the right. The sealing lip 24, additionally, has an outer, outward, prestressed, free edge 56. It can also be constructed this way in the other examples. It supports the expansion of the free ends 26 of the sealing lip 24 and makes certain there is no leakage between the two transfer parts 36, even when the abutting force is small.

As soon as the inner space 12 is filled, membrane 46 is pushed to the left forcing hydraulic fluid out of space 48. It flows into space 50 and pushes body 54 to the left. Because of this, the transfer parts 36, which are evenly distributed, move out together on the inner side 27 of the sealing lip 24 and are forced radially in an outward direction.

It has proved to be of advantage to make the cylindrical inner side 27 of the sealing lip 24 as large in area as the area of partition 16. Through this a large amount is added to the pad's holding power in the tube to be sealed 22. Much shorter lips which serve only to seal are not excluded by this. Likewise, longer lips 24 are also not excluded.

Basically, the sealing devices can also be constructed ring-shaped. In the inner space of this type of ring-sealing device, a sealing device like the invention is used, or another according to the state of the art.

Figure 5:
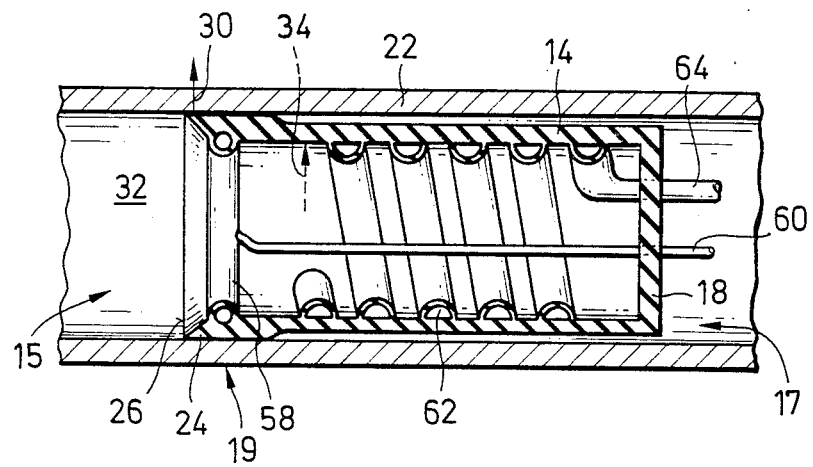
Figure 6:
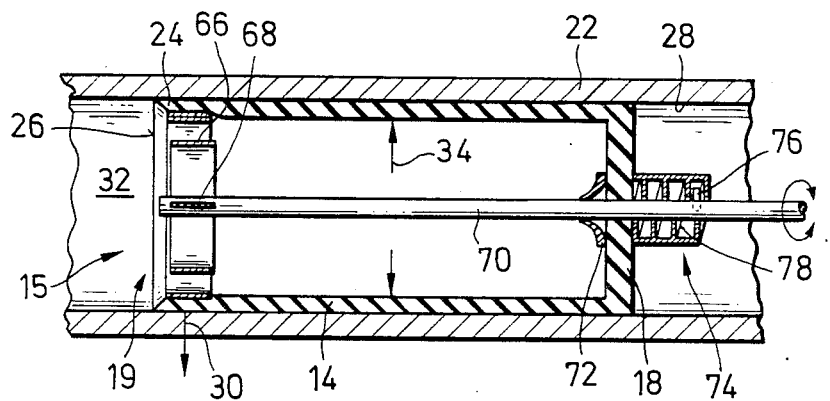

In the example in FIGS. 5 and 6, sealing devices are shown which have no inner space 12. The example in FIG. 5 is essentially the same as the example in FIG. 1; however, the partition 16 is not present. This has the advantage that a counter pressure in space 32 does not cause a bulging of partition 16 and thus does not cause a negative pressure on the sealing lip 16. At the same time, the abutting force of jacket 14 is dependent upon the counter force in space 32. In the example in FIG. 1, this abutting force of jacket 14 is constant because it is only dependent on the pressure in inner space 12.

In the example in FIG. 5, directly next to the free end 26 of the sealing lip 24, a ring chamber similar to that in FIG. 1 is provided. It can be filled through hose 60 with a pressure medium. The spreading device formed this way, as in the example in FIG. 1, creates a pressing force through the sealing lip 24 against the inner wall 28 of the tube 22. The advantage here is that this inner pressure in the ring chamber 58 is not lessened by the pressure of the blocked medium, but is increased by it. In addition, on the inner wall of the jacket there is provided a screw-shaped pressure tube 62, which can be pressurized separately from the ring chamber 58 through the end partition 18. In this way, the jacket 14 can be fixed to the inner wall 28 of the tube 22, and the hold of the sealing device in the tube can be improved. It is also important that the pressure in space 32, that is the counter pressure, does not weaken the abutting force of the jacket 14 against the inner wall 28.

The jacket 14 changes over as one piece into the sealing lip 24. As in the examples, both are made of a material that is impermeable to fluids and gas and is somewhat flexible. Rubber especially, preferably vulcanized rubber sheeting, strengthed with steel cord, can be used.

In the example in FIG. 6, the spreading device 19 is mechanical. For this, near the sealing lip 24, which again changes over directly into the jacket 14, there is a spiral spring made of flat, lamellar, spring steel which to the outside is connected with the lip 24 and whose inner-lying end 68 is located on the axis of the jacket 14. On this end 68 there is a rotatable rod 70. By turning this rod in one direction the spiral spring 66 is placed under tension and the sealing lip 24, in particular its free end 26, is pressed to the outside. Turning in the other direction pulls the sealing lip 24 to the inside. Illustrated is the activated state of the spreading device. The lip 24 is pressed against the inner wall 28.

In the drawing in FIG. 6, in contrast to that in FIG. 5, the basic assumption is that in space 32 there is already a considerable counter pressure. The jacket 14 is pressed to the inner wall 28. This state in the example in FIG. 5 can be attained by filling through pressure hose 62 and/or by a sufficient counter pressure as shown by arrow 34.

The rod can be rotated through the right end partition 18, but is sealed tight in going through it. To bring this about, an oil seal is provided on the pressure side of this end partition 18, of the kind used in manufacturing automobiles. On the outside there is an arresting device 74 for the two turning states of the rod 70 on the outside of the end partition 18. With it the two states of the spreading device 19, namely the relaxed state and the activated state, are brought about mechanically. This, of course, is done in opposition to the retracting force of the spiral spring 66. In the example, the arresting device 74 is made of a bolt 76 projecting radially from the rod 70, and a spiral surface 78. The latter has locking points into which the bolt 76 can be turned through the spiral spring 66, and thus the rod 70 can be held firmly in fixed position. Other forms of arresting device are possible.

In place of the spreading devices 19 which are shown merely as examples, any number of other spreading devices can be attached to the inner side 27 of the sealing lip 24, or can be built into the sealing lip 24 itself. For example, in FIG. 2 the spreading force can be brought about by a hydraulic cylinder/piston, which acts on surfaces 38 and is exerted axially. In this case, partition 16 can be eliminated. Likewise, in FIG. 4, space 50 can be closed to the right by eliminating the vents 44. Into space 50 a pressure hose is inserted and through it the space can be filled or emptied. The spreading device can also be operated purely mechanically, for example, by a Bowden wire, as used on a bicycle.

In the drawings, the end area on the pressure side of the jacket 14 is designated by the reference number 15, the end area away from pressure by the reference number 17.

I claim:

1. Sealing device for a tube which can be installed at a selected location on the inner wall of the tube and can withstand a pressure differential between a higher pressure and a lower pressure in the tube, wherein said device has a first end area facing the higher pressure in the tube, and a second end area on the lower pressure side in the tube, and is constructed of a cylindrical jacket made of flexible material impermeable to fluids and gas, and a circular end partition made of material impermeable to gas and fluids which seals the jacket tightly at the second end area characterized by the fact that on the first end area on the side facing the higher pressure there is a circular, ring-shaped sealing lip in form of an axial extension of the jacket, said lip protruding from the jacket towards the higher pressure side in the tube, having an inner side subjected to the higher pressure, being made of flexible material impermeable to fluids and gas, having a free end and an adjustable spreading device which can be reset and can press the sealing lip and its free end against the inner wall of the tube, so that when the spreading device is not activated, the lip is in a radially retracted position and it lies within a cylinder whose radius is smaller than the inner radius of the tube, but when the spreading device is activated, the lip, especially at its free end, is pressed outward and lies around the circle on all surfaces pressed against the inner wall of the tube to be sealed, whereby the higher pressure acting on the inner side increases the pressure of the lip onto the inner wall of the tube and causes there an outward pressure which becomes larger as the pressure of the higher pressure side increases.

2. A sealing device as set forth in claim 1, characterized by the fact that as a spreading device on the inner side of the sealing lip or inside the sealing lip there is a ring-shaped, circular tightly sealed ring chamber, in particular, a pressure tube which can be filled through a hose with a pressure medium.

3. A sealing device as set forth in claim 1, characterized by the fact that the sealing lip when not activated by the spreading device automatically assumes a relaxed position with a small outer diameter, and that the sealing lip or the spreading device is provided with a return spring.

4. A sealing device as set forth in claim 1, characterized by the fact that the sealing lip is made of an elastic, expandable material and is provided with a means of being initially stressed.

5. A sealing device as set forth in claim 1, characterized by the fact that between the sealing lip and the end area away from pressure there is a circular partition impermeable to fluids and gas, and this partition together with the jacket and the end partition, form a tight, inflatable inner space which can be accessed through a nipple which is located in the end partition.

6. A sealing device as set forth in claim 5, characterized by the fact that the two partitions, the sealing lip, and at least a part of the jacket when the inner space is not filled, can be folded automatically when the pressure in the inner space is lowered.

7. A sealing device as set forth in claim 1, characterized by the fact that the spreading device has a spiral spring and a turnable activator rod with an arresting device.

8. A sealing device as set forth in claim 1, characterized by the fact that the spreading device has transfer parts which are placed between the partition and the inner side of the sealing lip.

9. A sealing device as set forth in claim 1, characterized by the fact that the axial length of the jacket including the sealing lip is larger than the diameter of the jacket.

10. A sealing device as set forth in claim 1, characterized by the fact that the sealing lip extends out to a point at its free end, that it has an outer side which is cylindrical, and that its inner side is conical.

* * * * *